United States Patent [19]

Ulm

[11] 4,016,906
[45] Apr. 12, 1977

[54] ANTI-LEAK FUEL PUMPS FOR VEHICLES
[75] Inventor: Ralph E. Ulm, Fairfield, Ill.
[73] Assignee: Airtex Products, Div. of United Industrial Syndicate, Inc., New York, N.Y.
[22] Filed: Mar. 9, 1976
[21] Appl. No.: 665,249
[52] U.S. Cl. .......................................... 137/516.21
[51] Int. Cl.² ........................................ F16K 15/08
[58] Field of Search ..... 137/512.15, 516.11–516.23

[56] References Cited
UNITED STATES PATENTS

| 1,003,819 | 9/1911 | Staples | 137/516.23 |
| 3,238,967 | 3/1966 | Smith | 137/516.21 |

Primary Examiner—Robert G. Nilson

[57] ABSTRACT

Federal regulations require certain safety features on road vehicles in connection with leakage from gasoline filled devices, such as fuel pumps, wherein only a certain amount of leakage over a specified time period is permitted in a barrier crash or roll over. The invention herein is particularly directed to minimizing leakage so as to conform to federal regulations insofar as fuel pumps are concerned by modification of existing check valves minimizing retooling expense by providing a backup washer spring pressed over an area of the valve disc so as to apply sealing pressure in a pair of spaced concentric areas on the valve seat. This precludes edge curling of the valve disc and ultimate leakage as well as increasing the wear life.

7 Claims, 6 Drawing Figures

ANTI-LEAK FUEL PUMPS FOR VEHICLES

In prior art known to the applicant, a backup washer spring pressed against the rubber valve disc has been known but is subject to the drawback that the edge of the washer is dished to bear directly against the central area of the rubber valve disc. This has been found to effect a permanent cupping or curling of the material of the valve disc away from the valve seat which will produce leakage in the course of time since there is no direct seating pressure on areas of the valve disc where it contacts the valve seat.

The present invention overcomes the difficulty by the use of a backup washer which can be formed in various ways so as to provide a pressure in spaced areas concentrically on the valve disc using a valve seat of conventional apertured construction. A detailed description of the invention now follows in conjunction with the appended drawing in which.

Figure 1:
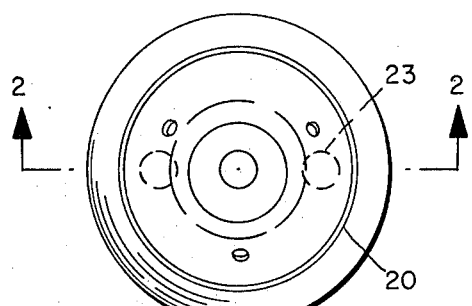
FIG. 1 is a plan view of a check valve which may be either an inlet or an outlet valve for a fuel pump and is of conventional construction except for the modification introduced by this invention.
Figure 2:
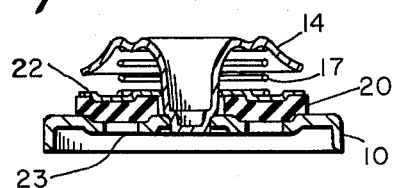
FIG. 2 is an enlarged cross section through FIG. 1 taken on the section line 2—2.
Figure 3:
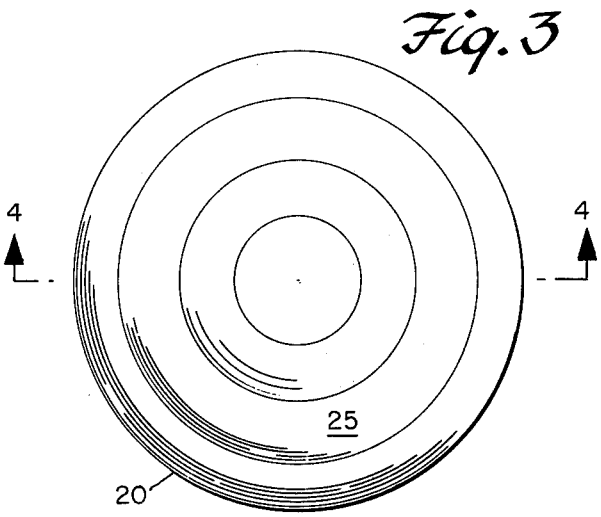
FIG. 3 is a plan view of one form of backup washer used to produce the effect of the invention.
Figure 4:
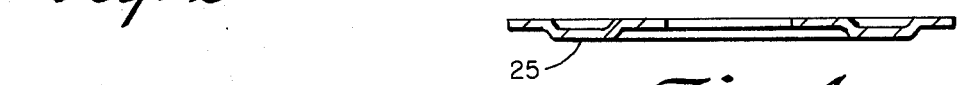
FIG. 4 shows a cross section on the section line 4—4 of FIG. 3.

Referring to FIGS. 1–4, the invention comprises a fuel pump check valve of conventional construction having the apertured seat member 10, the spring cage 14, the spring 17, the rubber valve disc 20 and a backup washer 22. As is conventional, the spring cage and the valve seat are secured together in a well known manner which need not be described herein, the valve seat apertures, such as aperture 23, being provided in the valve seat in the usual manner, four being indicated in FIG. 1.

Figure 5:
FIG. 5 is a fragmentary vertical cross section to an enlarged scale modification.

The novelty of the invention resides in the use of a backup washer 22 which is pressed by the spring 17 against the back of the valve disc 20 so as to deform the disc in accordance with the ribbed or ridged configuration of the backup washer. Thus, as seen in FIG. 5, an annular ridge 25 is provided in the backup washer 22 so as to form inclined edges 25a and 25b which has the effect of forcing the valve disc to conform to the plateau-like shape of the bottom of the backup washer. This has the effect of providing two concentric sealing areas on the valve seat inwardly and outwardly of the radial ring of apertures 23.

In effect, the backup washer 22, normally urged by a spring 17 somewhat stronger than conventionally used in check valves, produces strongly sealed areas at the points indicated by the slanted arrows $a$ and $b$, indicating force direction as shown in FIG. 5. This results in a double sealing effect positively preventing any curl of the rubber material of the valve disc. Thus, compressed annular areas shown by phantom lines designated by spaced arrows $c$ indicating the radial dimensions of the areas are radially inwardly and outwardly of apertures 23.

Figure 6:
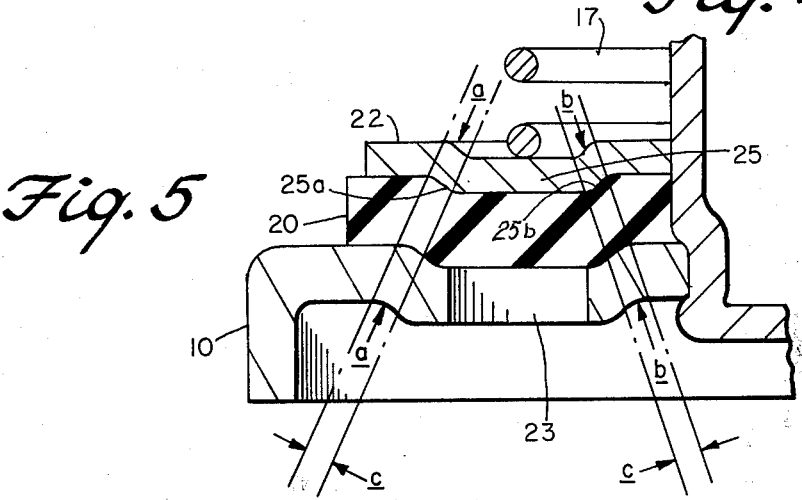
FIG. 6 is an enlarged view in vertical cross section of a modified arrangement.
Figure 6:
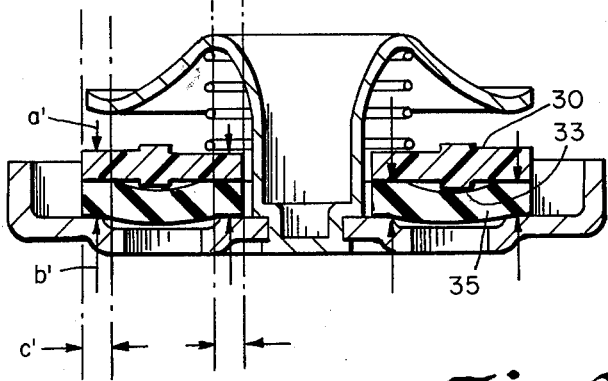

While the form of the invention shown in FIGS. 1 through 5 is believed to be preferred, the modification of FIG. 6 is thought feasible. In FIG. 6, instead of using a plateau having sloped edges pressing down into the valve disc, the backup washer 30 is provided with an annular ridge 33 which effects an arcuate shape of the valve disc 35 as shown. This has the effect of producing a distortion by compressive forces indicated by arrows $a'$, $b'$ such as to accentuate the pressure caused by the backup washer on the valve disc in concentric circular areas around the seat apertures in annular areas indicated by arrows $c'$ in FIG. 6 at the left-hand side of the diagram. These pressure areas exist circularly around the entire valve disc as in FIG. 5. It will be noted that the ridge 33 is duplicated on the upper side of the backup washer so that it may be put in place in the assembly with no need for differentiating between the top and bottom surfaces of the backup washer. Such backup washer as shown in FIG. 6 is preferably a plastic molded member easily and economically mass produced, while the backup washer of FIGS. 1–5 may be stamped sheet metal or plastic molded. In either case the upper face has a depressed area for centering the valve spring.

In general, concentric areas of compression of the valve disc are effected on radially opposite sides of the apertures with the ridge or plateau of the backup washer spanning the apertures and having margins, either flat or slanted, which generally match or are parallel to the margins of the array of apertures.

What is claimed is:

1. A unitary fuel pump check valve having a valve seat member provided with a circular array of apertures therethrough;
    a flexible valve disc overlaying said apertures to close flow therethrough and extending radially inwardly and outwardly thereof;
    a spring pressed backup water having a ridge;
    said ridge pressing into said flexible disc to deform it toward said apertures;
    said backup washer effecting radially spaced circular areas of compression of said disc on radially opposite sides of said apertures against said valve seat member.

2. A unitary fuel pump check valve as set forth in claim 1, wherein said ridge effects a plateau area extending axially at one side of the washer, the opposite side of said plateau area being depressed.

3. A unitary fuel pump check valve as set forth in claim 1, wherein said backup washer is of molded plastic having a circular disc-like body with at least one axially extending ridge.

4. A unitary fuel pump check valve as set forth in claim 1, wherein said backup washer is of molded plastic comprising a disc-like member having an axially extending ridge on each face thereof.

5. A unitary fuel pump check valve as set forth in claim 1, said backup washer and the peripheral margins of said apertures having opposed generally parallel areas to effect concentric areas of compression therebetween.

6. A unitary fuel pump check valve as set forth in claim 1, said backup washer comprising a disc-like member and said ridge effecting a plateau area extending from one face thereof with margins having a slant intermediate the body of said disc-like member and said plateau area;

said seat member having a disc-like body with the plane of apertures therethrough spaced from the surface of said valve seat and said apertures having margins having a slant from the plane of said disc-like member to the plane of said apertures and generally parallel to margins of said plateau wherein said areas of compression are effected between the backup washer margins and the aperture margins.

7. A unitary fuel pump check valve as set forth in claim 1, said backup washer comprising a disc-like member having opposed essentially flat surfaces with at least one ridge extending axially therefrom and said seat member having flat circular areas concentric radially inwardly and outwardly of said apertures wherein said areas of compression occur between oppositely disposed flat surfaces of said backup washer and said seat member.

* * * * *

UNITED STATES PATENT AND TRADEMARK OFFICE
CERTIFICATE OF CORRECTION

PATENT NO. : 4,016,906
DATED : April 12, 1977
INVENTOR(S) : Ralph E. Ulm

It is certified that error appears in the above-identified patent and that said Letters Patent are hereby corrected as shown below:

In claim 1, column 2, line 39, the term "water" should be -- washer --.

Signed and Sealed this

Twenty-ninth Day of September 1981

[SEAL]

Attest:

Attesting Officer

GERALD J. MOSSINGHOFF

Commissioner of Patents and Trademarks